United States Patent
Chatterjee et al.

(10) Patent No.: US 10,114,566 B1
(45) Date of Patent: Oct. 30, 2018

(54) SYSTEMS, DEVICES AND METHODS USING A SOLID STATE DEVICE AS A CACHING MEDIUM WITH A READ-MODIFY-WRITE OFFLOAD ALGORITHM TO ASSIST SNAPSHOTS

(71) Applicant: American Megatrends, Inc., Norcross, GA (US)

(72) Inventors: Paresh Chatterjee, Fremont, CA (US); Srikumar Subramanian, Suwanee, GA (US); Senthilkumar Ramasamy, Duluth, GA (US); Narayanaswami Ganapathy, Newark, CA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 37 days.

(21) Appl. No.: 15/145,878

(22) Filed: May 4, 2016

Related U.S. Application Data (60) Provisional application No. 62/158,053, filed on May 7, 2015.

(51) Int. Cl.
*G06F 3/06* (2006.01)
*G06F 12/0831* (2016.01)
(Continued)

(52) U.S. Cl.
CPC .......... *G06F 3/0619* (2013.01); *G06F 3/065* (2013.01); *G06F 3/0665* (2013.01);
(Continued)

(58) Field of Classification Search
CPC .......... G06F 11/108; G06F 2212/7208; G06F 11/1008; G06F 3/0679; G06F 3/0659;
(Continued)

(56) References Cited

U.S. PATENT DOCUMENTS

| 4,989,131 A | 1/1991 | Stone |
| 5,499,337 A | 3/1996 | Gordon |

(Continued)

OTHER PUBLICATIONS

Co-pending U.S. Appl. No. 15/145,084, filed May 3, 2016.
(Continued)

*Primary Examiner* — Mardochee Chery
(74) *Attorney, Agent, or Firm* — Meunier Carlin & Curfman LLC (57) ABSTRACT

A method for offloading RMW operations on a volume of a storage system to a caching medium includes providing an SSD cache, a data structure for managing the SSD cache and cache headers for managing cache lines. The method also includes maintaining cache headers for cache lines corresponding to a same chunk of the volume as a group, creating a snapshot of the volume and, after creating the snapshot, receiving a write I/O operation directed to a portion of the same chunk. The method further includes allocating a new RMW header for the write I/O operation, maintaining the new RMW header in a new group, performing the write I/O operation on the SSD cache, allocating an old RMW header for the group, maintaining the old RMW header with the group and providing a link between the new and old RMW headers.

20 Claims, 6 Drawing Sheets

(51) Int. Cl.
*G06F 12/0806* (2016.01)
*G06F 12/128* (2016.01)

(52) U.S. Cl.
CPC .......... *G06F 3/0685* (2013.01); *G06F 3/0689* (2013.01); *G06F 12/0806* (2013.01); *G06F 12/0833* (2013.01); *G06F 12/128* (2013.01); *G06F 3/0604* (2013.01); *G06F 3/0611* (2013.01); *G06F 3/0658* (2013.01); *G06F 3/0659* (2013.01); *G06F 2003/0697* (2013.01); *G06F 2212/621* (2013.01); *G06F 2212/69* (2013.01)

(58) Field of Classification Search
CPC ........... G06F 2003/0697; G06F 3/0604; G06F 3/0611; G06F 3/0658; G06F 3/0688; G06F 3/061
USPC .................................................. 711/103, 114
See application file for complete search history.

(56) References Cited

U.S. PATENT DOCUMENTS

| | | | |
|---|---|---|---|
| 5,680,579 A | 10/1997 | Young et al. | |
| 5,732,240 A | 3/1998 | Caccavale | |
| 5,799,324 A | 8/1998 | McNutt et al. | |
| 5,802,561 A | 9/1998 | Fava et al. | |
| 5,892,937 A | 4/1999 | Caccavale | |
| 6,175,900 B1 | 1/2001 | Forin et al. | |
| 6,490,578 B1 | 12/2002 | Burkhard | |
| 6,523,102 B1 | 2/2003 | Dye et al. | |
| 6,553,511 B1* | 4/2003 | DeKoning | G06F 11/1076 707/999.1 |
| 6,606,629 B1* | 8/2003 | DeKoning | G06F 11/1076 |
| 6,651,153 B1 | 11/2003 | Orfali | |
| 7,177,850 B2 | 2/2007 | Argenton et al. | |
| 7,257,684 B1 | 8/2007 | Sinha et al. | |
| 8,219,724 B1 | 7/2012 | Caruso et al. | |
| 8,572,736 B2 | 10/2013 | Lin | |
| 8,631,472 B1 | 1/2014 | Martin et al. | |
| 8,775,741 B1 | 7/2014 | de la Iglesia | |
| 9,256,272 B2 | 2/2016 | Hasegawa et al. | |
| 9,501,420 B2 | 11/2016 | Susarla et al. | |
| 9,632,932 B1 | 4/2017 | Sutardja et al. | |
| 9,798,754 B1 | 10/2017 | Shilane et al. | |
| 2002/0091965 A1 | 7/2002 | Moshayedi | |
| 2004/0148471 A1 | 7/2004 | Wallin et al. | |
| 2004/0260883 A1 | 12/2004 | Wallin et al. | |
| 2005/0278486 A1 | 12/2005 | Trika et al. | |
| 2007/0006013 A1 | 1/2007 | Moshayedi et al. | |
| 2007/0260811 A1 | 11/2007 | Merry et al. | |
| 2009/0204853 A1 | 8/2009 | Diggs et al. | |
| 2009/0210620 A1 | 8/2009 | Jibbe et al. | |
| 2009/0228646 A1 | 9/2009 | Edwards et al. | |
| 2010/0070703 A1* | 3/2010 | Sarkar | G06F 3/0613 711/114 |
| 2010/0082879 A1* | 4/2010 | McKean | G06F 3/0611 711/103 |
| 2010/0088459 A1 | 4/2010 | Arya et al. | |
| 2010/0100664 A1 | 4/2010 | Shimozono | |
| 2010/0122200 A1 | 5/2010 | Merry et al. | |
| 2010/0235670 A1 | 9/2010 | Keller et al. | |
| 2010/0250842 A1 | 9/2010 | Deshpande et al. | |
| 2010/0299547 A1 | 11/2010 | Saika | |
| 2011/0029686 A1 | 2/2011 | Sethi et al. | |
| 2011/0087833 A1 | 4/2011 | Jones | |
| 2011/0173378 A1 | 7/2011 | Filor et al. | |
| 2011/0238922 A1 | 9/2011 | Hooker et al. | |
| 2012/0072698 A1 | 3/2012 | Unesaki et al. | |
| 2012/0185647 A1 | 7/2012 | Dawkins | |
| 2012/0221774 A1 | 8/2012 | Atkisson et al. | |
| 2013/0038961 A1 | 2/2013 | Song | |
| 2013/0122856 A1 | 5/2013 | Kalmbach et al. | |
| 2013/0145223 A1 | 6/2013 | Okada et al. | |
| 2013/0185511 A1 | 7/2013 | Sassone et al. | |
| 2013/0285835 A1 | 10/2013 | Kim et al. | |
| 2013/0318603 A1 | 11/2013 | Merza | |
| 2014/0050002 A1 | 2/2014 | Sun | |
| 2014/0052942 A1 | 2/2014 | Satou | |
| 2014/0089558 A1 | 3/2014 | Baderdinni | |
| 2014/0095547 A1 | 4/2014 | Guo et al. | |
| 2014/0129758 A1 | 5/2014 | Okada et al. | |
| 2014/0143505 A1 | 5/2014 | Sim et al. | |
| 2014/0201442 A1 | 7/2014 | Rajasekaran et al. | |
| 2014/0325166 A1 | 10/2014 | Iyigun et al. | |
| 2015/0026410 A1 | 1/2015 | Ish et al. | |
| 2015/0095567 A1 | 4/2015 | Noda | |
| 2015/0206558 A1 | 7/2015 | Ni et al. | |
| 2015/0278127 A1 | 10/2015 | Takakura | |
| 2015/0370715 A1 | 12/2015 | Samanta et al. | |
| 2016/0004459 A1 | 1/2016 | Oohira | |
| 2016/0011782 A1 | 1/2016 | Kurotsuchi et al. | |
| 2016/0170639 A1* | 6/2016 | Velayudhan | G06F 3/061 711/114 |
| 2016/0276015 A1 | 9/2016 | Bains et al. | |
| 2017/0359371 A1 | 12/2017 | Merza | |

OTHER PUBLICATIONS

Co-pending U.S. Appl. No. 15/145,099, filed May 3, 2016.
Co-pending U.S. Appl. No. 15/145,111, filed May 3, 2016.
Co-pending U.S. Appl. No. 15/145,874, filed May 4, 2016.
Co-pending U.S. Appl. No. 15/145,883, filed May 4, 2016.

* cited by examiner

SYSTEMS, DEVICES AND METHODS USING A SOLID STATE DEVICE AS A CACHING MEDIUM WITH A READ-MODIFY-WRITE OFFLOAD ALGORITHM TO ASSIST SNAPSHOTS

CROSS-REFERENCE TO RELATED APPLICATIONS

This application claims the benefit of U.S. Provisional Patent Application No. 62/158,053, filed on May 7, 2015, entitled "SYSTEMS, DEVICES AND METHODS USING A SOLID STATE DEVICE AS A CACHING MEDIUM WITH A READ-MODIFY-WRITE OFFLOAD ALGORITHM TO ASSIST SNAPSHOTS," the disclosure of which is expressly incorporated herein by reference in its entirety.

BACKGROUND

Generally caching of block device data at a relatively lower latency device provides phenomenal performance for both read and write input/output ("I/O") operations. As a read cache, data is stored in the cache device until it is replaced with the new data. Until then, the data is read from the cache device for subsequent read I/O operations directed to the same data block. As a write cache, new data is written to the cache device, and the write I/O operation is informed completed. Later based on policy, the dirty data stored in the cache device is persisted to the underlying stable medium. In addition, the cache device can be a solid state device ("SSD"). When compared to a hard disk drive, SSD devices have superior read and write performance. It is therefore desirable to maximize use of the SSD device as the cache device to achieve a greater performance advantage.

Additionally, snapshot technologies are used to capture a point-in-time image of a data storage volume. In particular, a snapshot records the state of the data storage volume at a given time. The snapshot is preserved and then mounted, deleted and/or rolled back onto the data storage volume arbitrarily. Accordingly, snapshot technologies can be used in a number of applications including, but not limited to, data protection, security, backup and analysis. An example snapshot technology is re-direct-on-write ("ROW"). According to the ROW algorithm, when a new write I/O operation arrives at a logical block address ("LBA") of the data storage volume at which data was written before the snapshot, it is re-directed and written to a new LBA of the snapshot volume. The data storage volume therefore contains the point-in-time data, i.e., the snapshot, and the snapshot volume contains the changed data. Another example snapshot technology is copy-on-write ("COW"). A snapshot taken using the COW algorithm is similar to one taken using the ROW algorithm, except that the COW algorithm imposes a double-write penalty. For example, when a new write I/O operation arrives at a LBA of the data storage volume at which data was written before the snapshot, the old data at the LBA of the data storage volume is copied and written to a new LBA of the snapshot volume before the old data at the LBA of the data storage volume is overwritten.

After creating a ROW snapshot or a COW snapshot, read-modify-write ("RMW") operations are performed when sub-chunk-sized write I/O operations arrive at the data storage volume. For example, upon receiving a sub-chunk-sized write I/O operation, the following operations are performed: (1) old data for the entire chunk is read from the snapshot volume(s) (e.g., data stored at an old LBA), (2) the old data for the entire chunk is modified according to the write I/O operation and (3) the modified data for the entire chunk is written to the data storage volume (e.g., stored at a new LBA). In addition, when the SSD cache is controlled as a write cache, the RMW operation consumes more SSD cache space because the modified data for the entire chunk is stored in the SSD cache before being persisted to the underlying stable medium, which conflicts with the desire to maximize use of the SSD device as the cache device.

SUMMARY

Described herein are systems, devices and methods for offloading RMW operations on a logical volume of a data storage system to a caching medium for the data storage system. For example, instead of performing RMW operations on the logical volume, these operations are offloaded to an SSD cache layer that manages the SSD cache device, which improves I/O performance and maximize use of the SSD device.

An example computer-implemented method for offloading RMW operations on a volume of a data storage system to a caching medium for the data storage system can include providing an SSD cache including a plurality of cache lines, providing a data structure including a plurality of buckets for managing the SSD cache and providing a plurality of cache headers for managing the cache lines. Each cache header can associate a cache line and a corresponding data block of the volume. The method can also include maintaining cache headers for cache lines that correspond to a same chunk of the volume as a group within a same bucket of the data structure, creating a snapshot of the volume and, after creating the snapshot of the volume, receiving a write I/O operation directed to a portion of the same chunk of the volume. The method can further include allocating a new RMW header for at least one of the cache lines that cache new data for the write I/O operation, maintaining the new RMW header in a new group within a bucket of the data structure, performing the write I/O operation on the SSD cache by writing new data to a cache line, allocating an old RMW header for the group of the cache headers for the cache lines that cache data for the same chunk of the volume, maintaining the old RMW header with the group of the cache headers for the cache lines that cache data for the same chunk of the volume and providing a link between the new and old RMW headers.

Additionally, the step of providing a link between the new and old RMW headers can include providing at least one of the new RMW header or the old RMW header with a pointer that references the other of the new RMW header or the old RMW header.

Optionally, the method can also include receiving a read I/O operation directed to the same chunk of the volume and performing the read I/O operation. The read I/O operation can be performed by, using the cache headers of the group maintained within the same bucket of the data structure, reading data from the cache lines that cache data for the same chunk of the volume and, using the new RMW header of the new group maintained within the bucket of the data structure, reading the new data from the cache line that caches the new data for the write I/O operation. Additionally, the read I/O operation can be performed by following the link between the new RMW header and the old RMW header.

Optionally, the method can also include flushing data corresponding to the same chunk of the volume from the SSD cache to the data storage system. The data can be flushed by merging data from the cache lines that cache data for the same chunk of the volume and the new data from the cache line that caches the new data for the write I/O operation, flushing the merged data from the SSD cache to the data storage system and breaking the link between the new and old RMW headers.

Alternatively or additionally, the portion of the same chunk of the volume can be a sub-chunk-sized portion of the same chunk of the volume.

Alternatively or additionally, the SSD cache can be controlled in a write-back cache mode.

Alternatively or additionally, the snapshot can be a redirect-on-write snapshot or a copy-on-write snapshot.

It should be understood that the above-described subject matter may also be implemented as a computer-controlled apparatus, a computing system, or an article of manufacture, such as a computer-readable storage medium.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

DETAILED DESCRIPTION

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. The terms "optional" or "optionally" used herein mean that the subsequently described feature, event or circumstance may or may not occur, and that the description includes instances where said feature, event or circumstance occurs and instances where it does not. While implementations will be described for offloading RMW operations on a logical that caches the new data for the write I/O operation volume of a data storage system to a caching medium for the data storage system, it will become evident to those skilled in the art that the implementations are not limited thereto.

Figure 1:
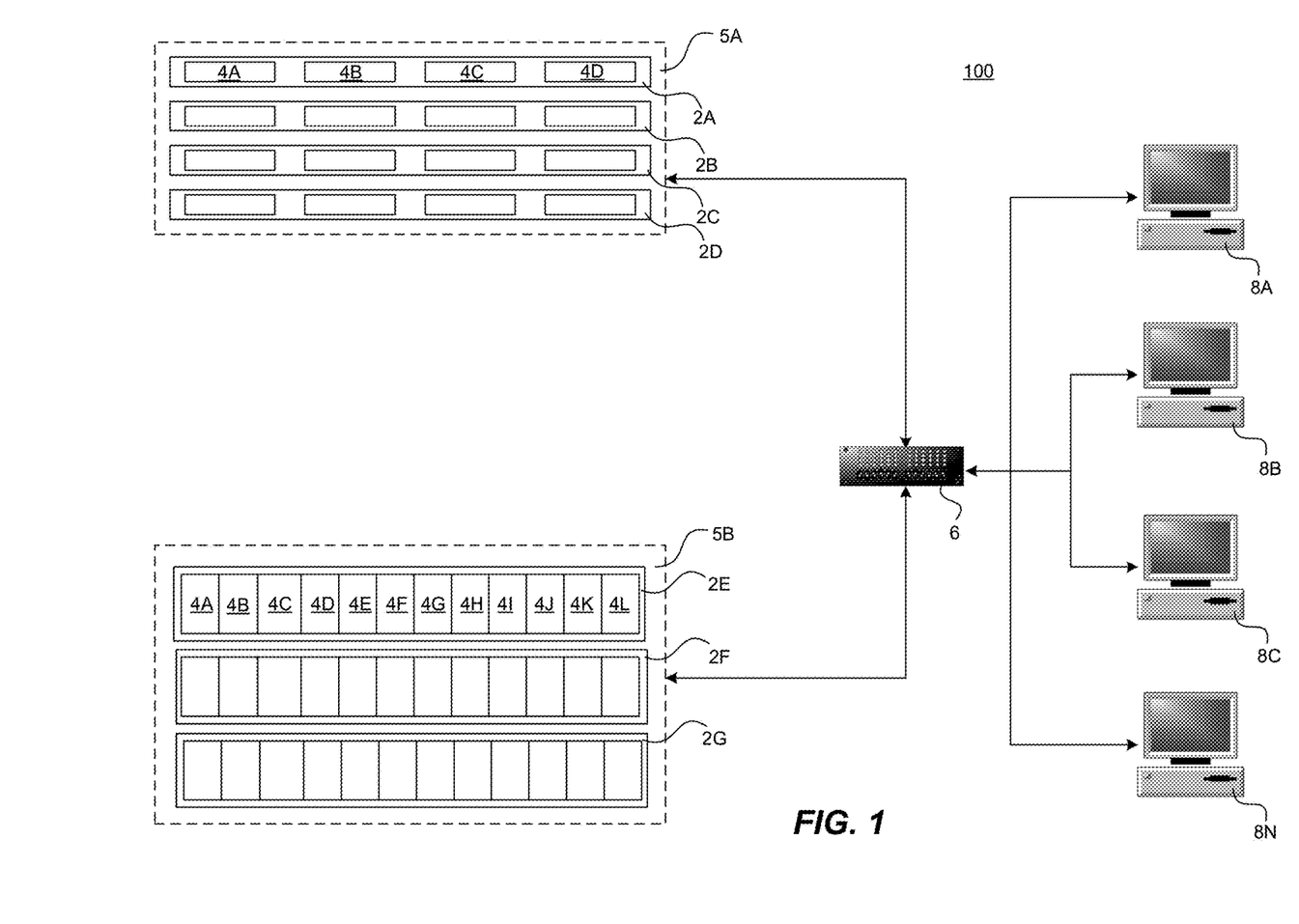
FIG. 1 is a computer architecture and network diagram showing aspects of a computer network and a storage server computer that provides an operating environment for embodiments of the disclosure presented herein.
Figure 2:
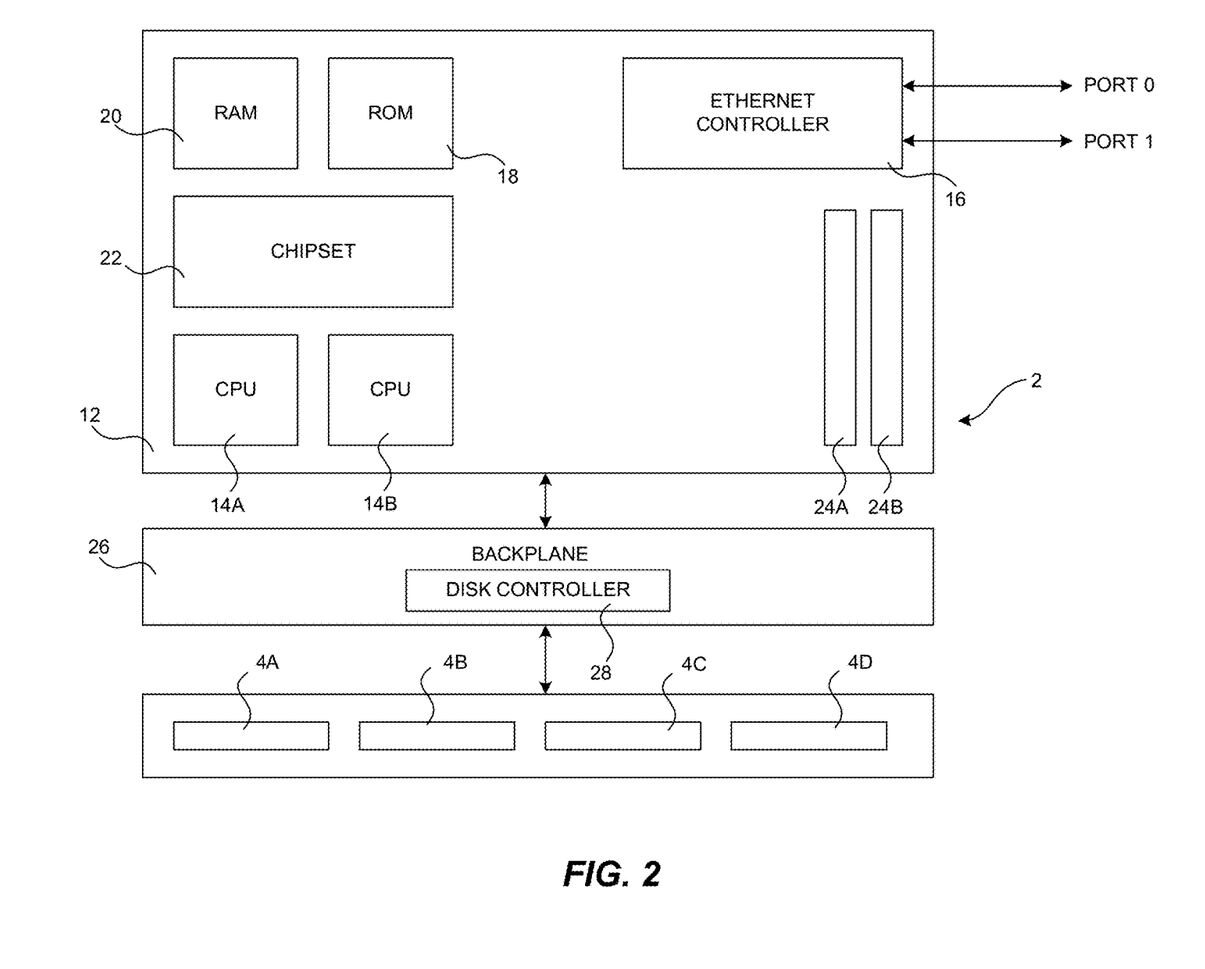
FIG. 2 is a computer architecture diagram illustrating aspects of the hardware of an illustrative storage server computer described herein.
Figure 3:
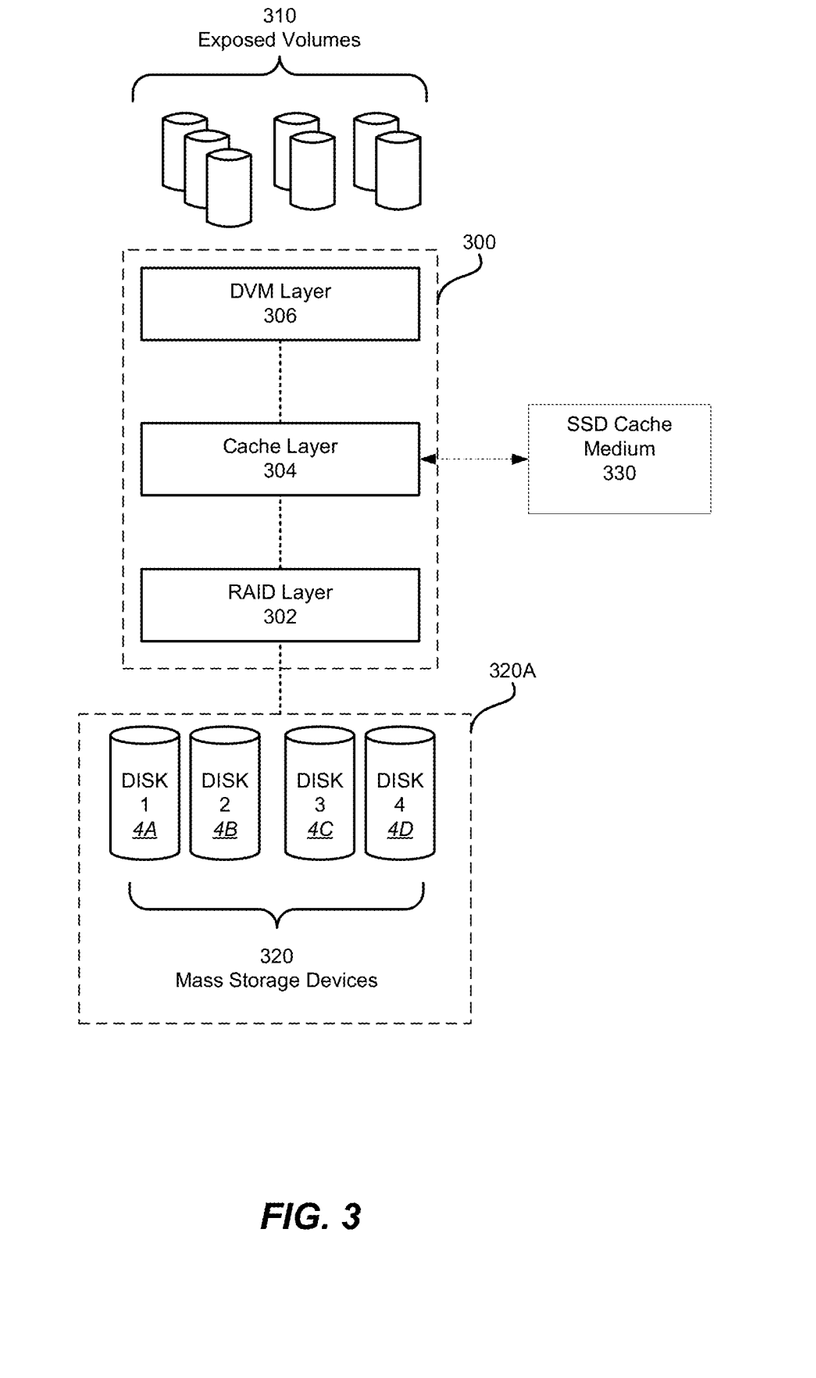
FIG. 3 is a software architecture diagram illustrating various aspects of a storage stack utilized by a storage server computer described herein.

FIGS. 1-3 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices. While the implementations presented herein will be described in the general context of program modules that execute in conjunction with an operating system on a computer system, those skilled in the art will recognize that they may also be implemented in combination with other program modules.

Turning now to FIG. 1, details will be provided regarding an illustrative operating environment for the implementations presented herein, as well as aspects of software components that provide the functionality described herein for using a plurality of SSDs as a caching medium for a data storage system. In particular, FIG. 1 is a network architecture diagram showing aspects of a storage system 100 that includes several virtualized clusters 5A-5B. A virtualized cluster is a cluster of different storage nodes that together expose a single storage device. In the example storage system 100 shown in FIG. 1, the clusters 5A-5B (collectively, clusters 5) include storage server computers 2A-2G (also referred to herein as "storage nodes" or a "node", collectively nodes 2) that are operative to read and write data to one or more mass storage devices, such as hard disk drives. The cluster 5A includes the nodes 2A-2D and the cluster 5B includes the nodes 2E-2G. All of the nodes 2 in a cluster 5 can be physically housed in the same rack, located in the same building, or distributed over geographically diverse locations, such as various buildings, cities, or countries.

According to implementations, the nodes within a cluster may be housed in a one rack space unit storing up to four hard disk drives. For instance, the node 2A is a one rack space computing system that includes four hard disk drives 4A-4D (collectively, disks 4). Alternatively, each node may be housed in a three rack space unit storing up to fifteen hard disk drives. For instance, the node 2E includes hard disk drives 4A-4L. Other types of enclosures may also be utilized that occupy more or fewer rack units and that store fewer or more hard disk drives. In this regard, it should be appreciated that the type of storage enclosure and number of hard disk drives utilized is not generally significant to the implementation of the embodiments described herein. Any type of storage enclosure and virtually any number of hard disk devices or other types of mass storage devices may be utilized.

As shown in FIG. 1, multiple storage nodes may be configured together as a virtualized storage cluster. For instance, the nodes 2A-2D have been configured as a storage cluster 5A and the nodes 2E-2G have been configured as a storage cluster 5B. In this configuration, each of the storage nodes 2A-2G is utilized to handle I/O operations independently, but are exposed to the initiator of the I/O operation as a single device. It should be appreciated that a storage cluster may include any number of storage nodes. A virtualized cluster in which each node contains an independent processing unit, and in which each node can field I/Os independently (and route them according to the cluster layout) is called a horizontally virtualized or peer cluster. A cluster in which each node provides storage, but the processing and mapping is done completely or primarily in a single node, is called a vertically virtualized cluster.

Data may be striped across the nodes of each storage cluster. For instance, the cluster 5A may stripe data across the storage nodes 2A, 2B, 2C and 2D. The cluster 5B may similarly stripe data across the storage nodes 2E, 2F and 2G. Striping data across nodes generally ensures that different I/O operations are fielded by different nodes, thereby utilizing all of the nodes simultaneously, and that the same I/O operation is not split between multiple nodes. Striping the data in this manner provides a boost to random I/O performance without decreasing sequential I/O performance.

According to embodiments, each storage server computer 2A-2G includes one or more network ports operatively connected to a network switch 6 using appropriate network cabling. It should be appreciated that, according to embodiments of the invention, Ethernet or Gigabit Ethernet may be utilized. However, it should also be appreciated that other types of suitable physical connections may be utilized to form a network of which each storage server computer 2A-2G is a part. Through the use of the network ports and other appropriate network cabling and equipment, each node within a cluster is communicatively connected to the other nodes within the cluster. Many different types and number of connections may be made between the nodes of each cluster. Furthermore, each of the storage server computers 2A-2G need not be connected to the same switch 6. The storage server computers 2A-2G can be interconnected by any type of network or communication links, such as a LAN, a WAN, a MAN, a fiber ring, a fiber star, wireless, optical, satellite, or any other network technology, topology, protocol, or combination thereof.

Each cluster 5A-5B is also connected to a network switch 6. The network switch 6 is connected to one or more client computers 8A-8N (also referred to herein as "initiators"). It should be appreciated that other types of networking topologies may be utilized to interconnect the clients and the clusters 5A-5B. It should also be appreciated that the initiators 8A-8N may be connected to the same local area network (LAN) as the clusters 5A-5B or may be connected to the clusters 5A-5B via a distributed wide area network, such as the Internet. An appropriate protocol, such as the Internet Small Computer Systems Interface ("iSCSI") or Fiber Channel protocol may be utilized to enable the initiators 8A-8N to communicate with and utilize the various functions of the storage clusters 5A-5B over a wide area network such as the Internet. An appropriate protocol, such as iSCSI, Fiber Channel, or Serial Attached SCSI ("SAS"), is also used to enable the members of the storage cluster to communicate with each other. These two protocols need not be similar.

Examples of the disks 4 may include hard drives, spinning disks, stationary media, non-volatile memories, or optically scanned media; each, or in combination, employing magnetic, capacitive, optical, semiconductor, electrical, quantum, dynamic, static, or any other data storage technology. The disks 4 may use IDE, ATA, SATA, PATA, SCSI, USB, PCI, Firewire, or any other bus, link, connection, protocol, network, controller, or combination thereof for I/O transfers.

Referring now to FIG. 2, an illustrative computer hardware architecture for practicing various embodiments will now be described. In particular, FIG. 2 shows an illustrative computer architecture and implementation for each storage node 2. In particular, each storage server computer 2 includes a baseboard 12, or "motherboard," which is a printed circuit board to which a multitude of components or devices may be connected by way of a system bus or other electrical communication path. In one illustrative embodiment, these components include, without limitation, one or more central processing units ("CPUs") 14A-14B, a network adapter, such as the Ethernet controller 16, a system memory, including a Read Only Memory 18 ("ROM") and a Random Access Memory 20 ("RAM"), and other hardware for performing input and output, such as a video display adapter or a universal serial bus port ("USB"), not all of which are illustrated in FIG. 2.

The motherboard 12 may also utilize a system board chipset 22 implementing one or more of the devices described herein. One or more hardware slots 24A-24B may also be provided for expandability, including the addition of a hardware RAID controller to the storage server computer 2. It should also be appreciate that, although not illustrated in FIG. 2, a RAID controller may also be embedded on the motherboard 12 or implemented in software by the storage server computer 2. It is also contemplated that the storage server computer 2 may include other components that are not explicitly shown in FIG. 2 or may include fewer components than illustrated in FIG. 2.

As described briefly above, the motherboard 12 utilizes a system bus to interconnect the various hardware components. The system bus utilized by the storage server computer 2 provides a two-way communication path for all components connected to it. The component that initiates a communication is referred to as a "master" component and the component to which the initial communication is sent is referred to as a "slave" component. A master component therefore issues an initial command to or requests information from a slave component. Each slave component is addressed, and thus communicatively accessible to the master component, using a particular slave address. Both master components and slave components are operable to transmit and receive communications over the system bus. Buses and the associated functionality of master-slave communications are well-known to those skilled in the art, and therefore not discussed in further detail herein.

As discussed briefly above, the system memory in the storage server computer 2 may include including a RAM 20 and a ROM 18. The ROM 18 may store a basic input/output system ("BIOS") or Extensible Firmware Interface ("EFI") compatible firmware that includes program code containing the basic routines that help to transfer information between elements within the storage server computer 2. As also described briefly above, the Ethernet controller 16 may be capable of connecting the local storage server computer 2 to the initiators 8A-8N via a network. Connections which may be made by the network adapter may include LAN or WAN connections. LAN and WAN networking environments are commonplace in offices, enterprise-wide computer networks, intranets, and the Internet. The CPUs 14A-14B utilized by the storage server computer 2 are standard central processing units that perform the arithmetic and logical operations necessary for the operation of the storage server computer 2. CPUs are well-known in the art, and therefore not described in further detail herein. A graphics adapter may or may not be utilized within the storage server computer 2 that enables the display of video data (i.e., text and/or graphics) on a display unit.

As shown in FIG. 2, the motherboard 12 is connected via a backplane 26 and disk controller 28 to one or more mass storage devices. The mass storage devices may comprise hard disk drives 4A-4D or other types of high capacity high speed storage. The disk controller 28 may interface with the hard disk drives 4A-4D through a serial advanced technology attachment ("SATA") interface, a small computer system interface ("SCSI"), a fiber channel ("FC") interface, a SAS interface, or other standard interface for physically connecting and transferring data between computers and physical storage devices. The mass storage devices may store an operating system suitable for controlling the operation of the storage server computer 2, such as the LINUX operating system. The mass storage devices may also store application programs and virtually any other type of data. It should be appreciated that the operating system comprises a set of programs that control operations of the storage server computer 2 and allocation of resources. The set of programs, inclusive of certain utility programs, may also provide a graphical user interface to a user. An application program is software that runs on top of the operating system software and uses computer resources made available through the operating system to perform application specific tasks desired by the user.

The mass storage devices and their associated computer-readable media, provide non-volatile storage for the storage server computer 2. Although the description of computer-readable media contained herein refers to a mass storage device, such as a hard disk or CD-ROM drive, it should be appreciated by those skilled in the art that computer-readable media can be any available media that can be accessed by the local storage server. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Referring now to FIG. 3, an example computer software architecture for practicing the various embodiments presented herein will now be described. The computer software architecture can be implemented in a storage node 2 shown in FIGS. 1 and 2, for example. In particular, FIG. 3 illustrates a storage stack 300 used in the embodiments described herein. The storage stack 300 can include a RAID layer 302, a cache layer 304 and a distributed volume management ("DVM") layer 306. At the top of the storage stack 300, storage volumes 310 are exposed, for example, to the initiators 8A-8N shown in FIG. 1. At the bottom of the storage stack 300 are the mass storage devices 320, such as the disks 4A-4D, that are used to store the data. As discussed above, the mass storage devices are connected to a disk controller such as the disk controller 28 shown in FIG. 2. The disk controller interfaces with the mass storage devices using any standard interface such as SATA, SCSI, FC, SAS interface, etc. for physically connecting and transferring data between computers and the mass storage devices.

The RAID layer 302 abstracts the organization of the RAID array 320A and presents a logical block-level interface to higher layers in the storage stack 300. For example, the RAID layer 302 can implement RAID level 5, where data is striped across the plurality of disks (e.g., disks 4A-4D) in the RAID array 320A. In a four disk array, a RAID stripe includes data block $D_1$ stored on disk 1 (e.g., "4A"), data block $D_2$ stored on disk 2 (e.g., "4B"), data block $D_3$ stored on disk 3 (e.g., "4C") and parity block $P_A$ stored on disk 4 (e.g., "4D"), for example. The parity block $P_A$ can be computed using XOR logic of data block $D_1$, data block $D_2$ and data block $D_3$ (e.g., $P_A=D_1 \oplus D_2 \oplus D_3$). Additionally, the parity blocks in a RAID 5 array are distributed or staggered across the plurality of disks. Although RAID level 5 is discussed above, it should be understood that the RAID layer 302 can implement other RAID levels, such as RAID level 0, 1, 2, 3, 4 or 6.

The DVM layer 306 uses the block-level interface provided by the RAID layer 302 to manage the available storage capacity of the RAID array 320A and service I/O operations initiated by the initiators 8A-8N. The DVM layer 306 can implement a variety of storage management functions, such as volume virtualization, thin provisioning, snapshots, locking, data replication, etc. The DVM layer 306 can be implemented on the storage node 2 in software, hardware or a combination thereof. Volume virtualization provides the facility to create and manage multiple, logical volumes on the RAID array 320A, as well as expand a logical volume across multiple storage nodes within a storage cluster. Thin provisioning provides for the allocation of physical capacity of the RAID array 320A to logical volumes on an as-needed basis. For example, the available physical storage capacity of the RAID array 320A can be divided into a number of unique, equally-sized areas referred to as territories. Optionally, the size of a territory can be one terabyte (TB), a reduced size of 8 megabytes (MB) or any other territory size. Alternatively or additionally, the available physical storage capacity of the RAID array 320A can optionally be further subdivided into units referred to herein as provisions. The provisions can be unique, equally sized areas of the available physical capacity. For example, provisions may be 1 MB in size, a reduced size of 512 kilobytes (KB) or any other provision size. Optionally, a provision can be further subdivided into chunks. For example, the chunk size can be selected as 64 KB, a reduced size of 8 KB or any other chunk size. Snapshots provide functionality for creating and utilizing point-in-time snapshots of the contents of logical storage volumes. The locking functionality allows for synchronizing I/O operations within the storage node 2 or across nodes within the storage cluster. Data replication provides functionality for replication of data within the storage node 2 or across nodes within the storage cluster 2.

The cache layer 304 intercepts read and/or write I/O operations flowing between the RAID layer 302 and the DVM layer 306. The cache layer 304 is configured to read data from and/or write data to an SSD cache medium 330. The cache layer 304 can be implemented on the storage node 2 in software, hardware or a combination thereof. The SSD cache medium 330 can be used in either a write-through cache mode or a write-back cache mode. When the SSD cache medium 330 is controlled according to the write-through cache mode, a new read I/O operation (e.g., directed to a data block) is stored in the SSD cache medium 330 before returning the requested data block to the host (e.g., initiators 8A-8N shown in FIG. 1). Alternatively, the new read I/O operation can be performed in parallel, which decreases the response time to host. For example, once the requested data is retrieved from the mass storage devices 320, the retrieved data is stored in SSD cache medium 330 in parallel to returning the requested data block to the host. A subsequent read I/O operation requesting the read data block is retrieved from the SSD cache medium 330 instead of the mass storage devices 320. When the SSD cache medium 330 is controlled according to a write-back cache mode, a new write I/O operation (e.g., directed to a data block) is performed in the SSD cache medium 330. Then, the host (e.g., initiators 8A-8N shown in FIG. 1) is informed that the new write I/O operation is complete. At a later time, the data block (e.g., a dirty data block) is flushed or persisted to the mass storage devices 320 (e.g., the underlying stable medium). It should be understood that in either mode caching pairs the lower-latency SSD cache medium 330 with the mass storage devices 320. Additionally, the cache layer 304 can be configured to perform the operations for using the SSD cache medium 330 with a RMW offload algorithm as described in further detail below.

As described above, it is desirable to maximize the use of the available storage capacity of the SSD cache medium 330 due to its superior I/O performance capability as compared to that of the mass storage devices 320. An example technique to maximize use of the SSD cache medium 330 is to accommodate both smaller, random I/O operations as well as larger, sequential I/O operations. For example, instead of using 64 KB cache line granularity similar to conventional SSD cache applications, a smaller SSD cache line granularity such as 8 KB, for example, can optionally be used with the techniques described herein to maximize use of the SSD cache medium 330. When using 64 KB cache line granularity, a 64 KB cache line is underutilized when less than 64 KB of data (e.g., only 8 KB of data from a random I/O) is stored in the cache line. In other words, a portion of the storage capacity of the 64 KB cache line remains unused when only 8 KB of data is stored therein. On the other hand, when using 8 KB cache line granularity, use of the available storage capacity of the SSD cache medium 330 is maximized because less storage space is underutilized. For example, the SSD cache device with 8 KB cache line granularity can accommodate smaller, random I/O operations (e.g., 8 KB of data) in a single cache line, as well as larger, sequential I/O operations (e.g., 32 KB of data) in multiple cache lines. It should be understood that 8 KB cache line granularity is provided herein only as an example of smaller SSD cache line granularity and that SSD cache line granularity more or less than 8 KB (e.g., 4 KB, 16 KB, 32 KB, etc.) can be used with to the techniques described herein.

Figure 4A:
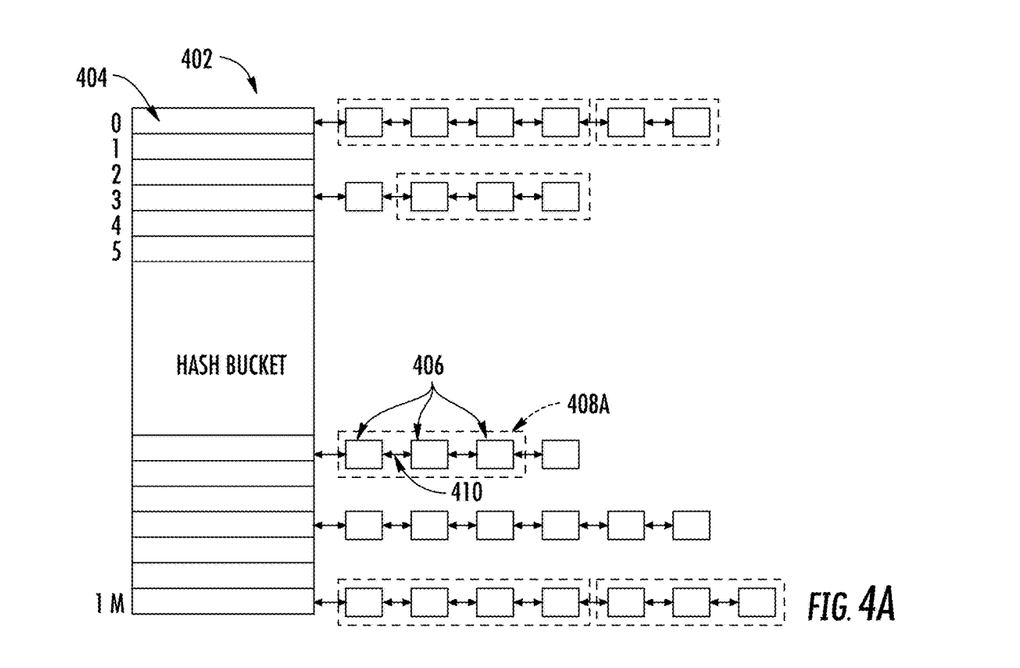
FIG. 4A is a block diagram illustrating an example data structure for managing an SSD cache as described herein.
Figure 4B:
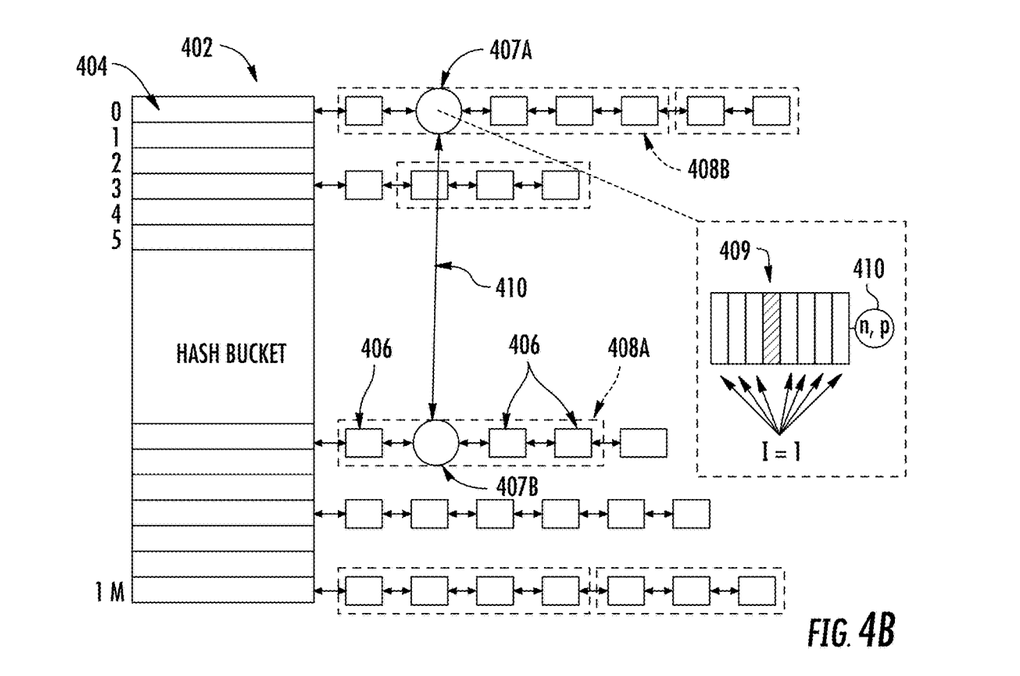
FIG. 4B is another block diagram illustrating an example data structure for managing an SSD cache as described herein.

Referring now to FIGS. 4A-4B, block diagrams illustrating an example data structure 402 for managing an SSD cache (e.g., the SSD cache medium 330 shown in FIG. 3) are shown. FIG. 4A is a block diagram illustrating the example data structure 402 before a primitive RMW function (described below) is called. FIG. 4B is a block diagram illustrating the example data structure 402 after the primitive RMW function is called. The data structure 402 can be a list having a plurality of entries or buckets 404. For example, the data structure 402 can be a hash bucket list. Cache headers (e.g., cache headers 406) can be provided for each cache line in order to manage the cache lines of the SSD cache. A cache header can be used to associate a cache line (e.g., the data stored in the cache line) with a corresponding data block stored in the underlying storage medium (e.g., the mass storage devices shown in FIG. 3). For example, a cache header can include an index to (or storage address of) a cache line in the SSD cache and a tag to (or storage address of) the corresponding data block stored in the underlying storage medium. As described further below, when an I/O operation is received, the cache headers can be searched to determine whether the I/O operation is a cache hit or a cache miss. Optionally, a cache header can also include one or more pointers such as previous or subsequent pointers to other cache headers, for example. Alternatively or additionally, a cache header can optionally include a counter for tracking a time of last access and/or a frequency of access of the cache line. As shown in FIGS. 4A-4B, the cache headers are assigned to the buckets 404 of the data structure 402. The cache headers can be linked to other cache headers and the buckets with pointers (e.g., pointer 410). This disclosure contemplates that cache headers can contain more or less information or fields for managing the cache lines of the SSD cache than as described above, including any information provided in cache headers as known in the art.

SSD cache devices typically have larger capacities as compared to conventional cache devices in addition to having superior I/O performance capability. An example conventional cache device has 256 MB capacity, and with 64 KB cache line granularity, there can be a maximum of approximately 4,000 cache lines and cache headers. On the other hand, an example SSD cache device has 64 GB capacity, and with a smaller 8 KB cache granularity, there can be a maximum of approximately 8 million cache lines and cache headers. It should be understood that a 64 GB SSD cache device is provided only as an example and that SSD cache devices with more or less capacity can be used with the techniques described herein. The complexity of searching the larger number of possible cache headers for the example SSD cache device to determine whether there is a cache hit or miss therefore substantially increases as compared to searching cache headers for the example conventional cache device.

To reduce the complexity of the search, a hashing algorithm can be used to assign cache headers to particular buckets 404 of the data structure 402. For example, a cache header can be assigned to a particular bucket of the data structure based on the location of the data block in the underlying storage medium (e.g., a contiguous region of the physical storage capacity of the underlying storage medium where the data block is stored). In other words, the hashing algorithm can return the same hash value for data blocks stored in the same contiguous region of the physical storage capacity of the underlying storage medium. Each contiguous region of the physical storage capacity (also referred to herein as a "physical chunk") has a continuous logical block address ("LBA") range at the RAID level. Additionally, each physical chunk is assigned to a particular logical volume or snapshot. In other words, each physical chunk is exclusive to a particular logical or snapshot volume. Accordingly, each logical chunk of a logical volume or snapshot will be associated with a continuous LBA range at the RAID level. As described in detail below, the linking of logical and snapshot volumes (e.g., using the new and old RMW headers 407A, 407B of FIG. 4B) during the offloaded RMW operations can occur at chunk-level granularity. Each physical chunk of the physical storage capacity can have a predetermined size such as 64 KB, for example. It should be understood that 64 KB is provided only as an example of the predetermined size and that the predetermined size can be more or less than 64 KB. Using the hashing algorithm, cache headers for cache lines storing data blocks stored within the same contiguous region of the physical storage capacity can therefore be assigned to the same bucket.

For example, in the data structure 402, cache headers for cache lines storing data blocks corresponding to the first 64 KB contiguous region of the physical storage capacity of the underlying storage medium can be assigned to a first bucket (e.g., bucket "0" shown in FIGS. 4A-4B). Cache headers for cache lines storing data blocks corresponding to the second 64 KB contiguous region of the physical storage capacity can be assigned to a second bucket (e.g., bucket "1" shown in FIGS. 4A-4B). Cache headers for cache lines storing data blocks corresponding to the third 64 KB contiguous region of the physical storage capacity can be assigned to a third bucket (e.g., bucket "2" shown in FIGS. 4A-4B). Cache headers for cache lines storing data blocks corresponding to a subsequent 64 KB contiguous region of the physical storage capacity can be assigned to a subsequent bucket until the final bucket (e.g., bucket "IM" shown in FIGS. 4A-4B) is reached. Thereafter, cache headers for cache lines storing data blocks corresponding to a subsequent 64 KB contiguous region of the physical storage capacity can be assigned to the first bucket (e.g., bucket "0" in FIGS. 4A-4B).

By assigning cache headers for cache lines to a particular bucket based on the location of the data block in the underlying storage medium, it is possible to maintain cache headers for cache lines that cache data for a same chunk of a logical volume as a group of cache headers within the particular bucket. In other words, the cache headers of a group of cache headers can be arranged next to each other (or sequentially) within the particular bucket. For example, as shown in FIGS. 4A-4B, a group of cache headers 408A includes a plurality of cache headers 406. The cache headers 406 of the group of cache headers 408A are cache headers for cache lines storing data blocks stored in a same contiguous region of the physical storage capacity, such as a 64 KB contiguous region, for example. Additionally, the cache headers 406 of the group of cache headers 408A are cache headers for cache lines that cache data for a same chunk of a logical volume, such as the same 64 KB chunk of the logical volume, for example. It is possible to distinguish between cache headers maintained in different groups of cache headers because each cache header contains a tag such as a logical block address ("LBA") to the corresponding data block stored in the underlying storage medium. Thus, a portion of the LBAs (e.g., a chunk index) in the cache headers for cache lines storing data from the same contiguous region of the physical storage capacity will be the same. In other words, cache headers for cache lines storing data blocks from the same contiguous region will share the same chunk index, and it is possible to distinguish between cache headers maintained in different groups of cache headers based on the chunk index.

An example technique for maintaining cache headers as a group of cache headers is to form a doubly-linked list. The cache headers belonging to a group of cache headers can be maintained together or sequentially within the doubly-linked list, for example, without a cache header belonging to another group of cache headers intervening therebetween. In a doubly-linked list, each cache header (with the exception of the last cache header) includes a previous pointer to a previous cache header (or bucket) and a subsequent pointer to a subsequent cache header in the doubly-linked list. The last cache header in the doubly-linked list includes a previous pointer to a previous cache header and a null pointer, for example. Because each of the cache headers includes previous and subsequent pointers, it is possible to traverse the doubly-linked list in either direction (e.g., forward and/or reverse directions). Additionally, a doubly-linked list facilitates insertion and/or removal of cache headers by modifying the previous and subsequent pointers of the effected cache headers.

Additionally, the groups of cache headers within the same bucket can be sorted based on a time of access. For example, the group of cache headers containing the cache header for the most-recently accessed cache line can be arranged at a head of the doubly-linked list. The group of cache headers containing the cache header for the least-recently accessed cache line can be arranged at a tail of the doubly-linked list. Additionally, one or more groups of cache headers between the groups of cache headers at the head and tail of the doubly-linked list, respectively, can be sorted based on access time. This disclosure contemplates that the time of last access can be tracked by a counter included in the cache headers. The counters in the cache headers can be used to sort the groups of cache headers within the doubly-linked list. Accordingly, this sorting ensures that searches for cache headers for more recently-accessed cache lines are returned faster.

The complexity of searching cache headers to determine whether there is a cache hit or miss is decreased when cache headers for cache lines that cache data for a same chunk of a logical volume are maintained as a group of cache headers within a particular bucket. For example, when an I/O operation directed to a sub-chunk-sized portion of a chunk of a logical volume (e.g., an 8 KB data block such as a random I/O operation or a portion of a sequential I/O operation), a hash value can be obtained using a hashing algorithm based on a 64 KB contiguous region of the underlying storage medium in which the 8 KB data block is stored. As described above, the hash value can be used to identify a particular bucket of the data structure 402 shown in FIGS. 4A-4B. Therefore, it is possible to avoid the scenario where cache headers for cache lines that cache data for the same chunk of a logical volume (e.g., the same 64 KB chunk) are assigned to different buckets, which would increase the complexity of the search because cache headers in multiple buckets must be searched to determine whether there is a cache hit or miss. Further, cache headers for cache lines that cache data for the same chunk of a logical volume (e.g., the same 64 KB chunk) are maintained as a group within the same bucket. Therefore, it is possible to avoid the scenario where these cache headers are distributed in different locations within the same bucket, which would increase the complexity of the search because all of the cache headers in the same bucket must be searched to determine whether there is a cache hit or miss.

As described above, ROW and COW snapshots are point-in-time images of a logical volume. After creating a snapshot, RMW operations are performed when sub-chunk-sized write I/O operations arrive at the logical volume. As used herein, a sub-chunk-sized write I/O operation is a write I/O operation directed to a portion of a chunk of the logical volume or a write I/O operation directed to less than an entire chunk of the logical volume. As described above, the logical volume can be subdivided into unique, equally-sized portions such as territories, provisions and chunks. For example, a chunk can optionally be a 64 KB block of the logical volume, and a sub-chunk-sized write I/O operation can be directed to an 8 KB portion of this 64 KB block of the logical volume. It should be understood that the sizes of the chunk and the sub-chunk-sized portions (i.e., 64 KB and 8 KB, respectively) are provided only as examples and that other sizes can be used with the techniques described herein.

Conventional RMW operations include the following operations: (1) reading old data for an entire chunk (e.g., a 64 KB block) from a logical volume, such as data stored at a LBA of a snapshot volume (e.g., data stored at an old LBA), (2) modifying the old data for the entire chunk according to the write I/O operation (e.g., modifying an 8 KB block of the 64 KB block) and (3) writing the modified data for the entire chunk to a new LBA, such as a LBA of a data storage volume (e.g., a new LBA). Additionally, when the SSD cache (e.g., the SSD cache medium 330 shown in FIG. 3) is controlled in a write-back cache mode, the modified data for the entire chunk is stored in the SSD cache before being persisted to the underlying stable medium (e.g., mass storage devices 320 shown in FIG. 3).

Instead of performing the conventional RMW operations, it is possible to offload these operations to the caching medium (e.g., the SSD cache medium 330 shown in FIG. 3) for the data storage system. For example, when the caching medium is controlled in the write-back cache mode, a primitive RMW function can be called by the cache layer (e.g., the cache layer 304 shown in FIG. 3) in response to a sub-chunk-sized write I/O operation for a first-time write to a chunk arriving at the logical volume after snapshot creation. It should be understood that the link between the logical and snapshot volumes (e.g., between the new and old RMW headers 407A, 407B of FIG. 4B) already exists for subsequent write I/O operations to a chunk arriving at the logical volume after snapshot creation. Thus, the subsequent write I/O operations can use the existing link between the logical and snapshot volumes created in response to the first-time write. Optionally, the link can be removed after the entire chunk has been overwritten. The primitive RMW function can be called with a new LBA to which the write will be made (e.g., a new LBA of the data storage volume) and an old LBA of the snapshot volume. In the example below, it is assumed that the old data (i.e., the data stored at the old LBA of the snapshot volume) remains cached in the caching medium.

In particular, after creating a snapshot of a logical volume, a new write I/O operation directed to a LBA at which data was written before the time of the snapshot arrives at the logical volume. As described above, the new write I/O operation is a sub-chunk-sized write I/O operation, e.g., a write I/O operation directed to less than an entire chunk of the logical volume. For example, the chunk is optionally a 64 KB block of the logical volume, and the sub-chunk-sized write I/O operation is optionally directed to an 8 KB portion of this 64 KB block of the logical volume. A new RMW header 407A can be allocated for the new write I/O operation. In addition, the new RMW header 407A can be maintained in a new group 408B within one of the buckets of the data structure 402 (e.g., bucket "0" of data structure 402). As described above and similar to the cache headers 406 of the group of cache headers 408A, the new RMW header 407A can be grouped with cache headers for cache lines that cache data for a same chunk of a logical volume and maintained within a particular bucket, for example, using the hashing algorithm described above. The new RMW header 407A is maintained in a different group of cache headers than the cache headers 406 because the new data for the write I/O operation is to be stored at a new LBA of the logical volume, which is different than the old LBA of the snapshot volume. For example, the cache headers of the new group of cache headers 408B are cache headers for cache lines that cache data for the 64 KB chunk of the logical volume where the modified old data will be written (e.g., a new LBA). The write I/O operation can then be performed on the SSD cache by writing the new data to the at least one of the cache lines. Therefore, instead of caching the entire chunk of modified data (e.g., 64 KB of data), only the new data for the write I/O operation (e.g., 8 KB of data) is stored in the cache medium.

Additionally, the new RMW header 407A can include an index to (or storage address of) one or more cache lines in the SSD cache and a tag to (or storage address of) the corresponding data block(s) stored in the underlying storage medium, for example. As described above, a smaller cache line granularity of 8 KB can optionally be used. Accordingly, if the sub-chunk-sized write I/O operation is directed to an 8 KB portion of a 64 KB block, the new RMW header 407A can include an index to a single cache line. It should be understood that the new RMW header 407A can include a plurality of indexes to different cache lines for caching larger write I/O operations (e.g., two indexes to two cache lines for a 16 KB write I/O operation, three indexes to three cache lines for a 24 KB write I/O operation, etc.). For example, the new RMW header 407A can have up to eight indexes for eight cache lines needed to cache eight sub-chunk-sized portions of the chunk of the logical volume (e.g., 64 KB chunk/8 KB cache line granularity). In addition, any unused index of the new RMW header 407A can be set to a predetermined value. This is shown in the dotted box shown in FIG. 4B, where the new RMW header contains an index 409 to a single cache header and the remaining indices are set to a predetermined value (e.g., I=1). As described below, when the primitive RMW function encounters an index set to the predetermined value, the primitive RMW function follows a link to an old RMW header.

In conventional RMW operations, old data for an entire chunk from a logical volume is read and then modified according to the new write I/O operation. For example, the old data can be data stored at a LBA of a snapshot volume (e.g., data stored at an old LBA). Assuming the old data remains cached in the caching medium (e.g., the SSD cache medium shown in FIG. 3), cache headers for cache lines that cache the old data can be found in the data structure 402. For example, in FIG. 4B, the cache headers 406 of the group of cache headers 408A are cache headers for cache lines that cache the old data. In addition, an old RMW header 407B can be allocated for the group of the cache headers 408A and maintained with the group of the cache headers 408A. Further, a link 410 can be provided between the new and old RMW headers 407A and 407B. For example, the new RMW header 407A can be provided with next and/or previous pointers 410 (e.g., n, p) to the subsequent and/or previous RMW headers in a chain. Similarly, the old RMW header 407B can be provided with next and/or previous pointers 410 (e.g., n, p) to the subsequent and/or previous RMW headers in a chain. In FIG. 4B, the new and old RMW headers 407A and 407B have pointers pointing to one another. It should be understood that any unused next and/or previous pointers of the new and old RMW headers 407A and 407B can be set to a null value. Accordingly, it is possible to follow the link 410 between the new RMW header 407A of the new group of cache headers 408B maintained within the one of the buckets of the data structure 402 and the old RMW header 407B of the group of cache headers 408A maintained within the same bucket of the data structure 402. Therefore, when a future read I/O operation directed to the same chunk of the logical volume is received, the new data can be read from the cache lines that cache the new data of the previous write I/O operation using the new RMW header 407A of the new group of cache headers 408B, and the old data can be accessed by following the link 410 between the new RMW header 407A and the old RMW header 407B and read from the cache lines that cache the old data using the cache headers 406 of the group of cache headers 408A.

In addition, it is possible to use the link 410 between the new RMW header 407A and the old RMW header 407B when flushing the SSD cache (e.g., the SSD cache medium 330 shown in FIG. 3) to the underlying stable medium (e.g., the mass storage devices 320 shown in FIG. 3). For example, when a subsequent snapshot is created, the chunk of the logical volume (e.g., a 64 KB block) corresponding to the sub-chunk-sized write I/O operation (e.g., the 8 KB block) can be flushed to the underlying stable medium. Before flushing the chunk of the logical volume to the underlying stable medium, the new data for the write I/O operation can be merged with the old data for the chunk of the logical volume. In other words, the RMW operation on the logical volume is delayed until the SSD cache is flushed to the underlying stable medium. For example, the data in the cache lines managed by the cache headers 406 of the group of cache headers 408A can be read. This data is the old data stored at a LBA of the snapshot volume (e.g., data stored at an old LBA). Then, the data in the cache lines managed by the new RMW header 407A of the new group of cache headers 408B can be read. This data is the new data for the write I/O operation. Optionally, in the cases when the entire chunk of the logical volume is not cached in the SSD cache, remaining data for the chunk can be read from the logical volume. Then, the old data stored at the LBA of the snapshot volume, the new data for the write I/O operation, and optionally, the remaining data from the logical volume not cached in the SSD cache can be merged (i.e., modified by the new data for the write I/O operation). The modified chunk can then be written to the logical volume (e.g., at the new LBA of the logical volume). Further, because the link 410 between the new RMW header 407A and the old RMW header 407B is no longer needed, the link 410 can be broken.

Figure 5A:
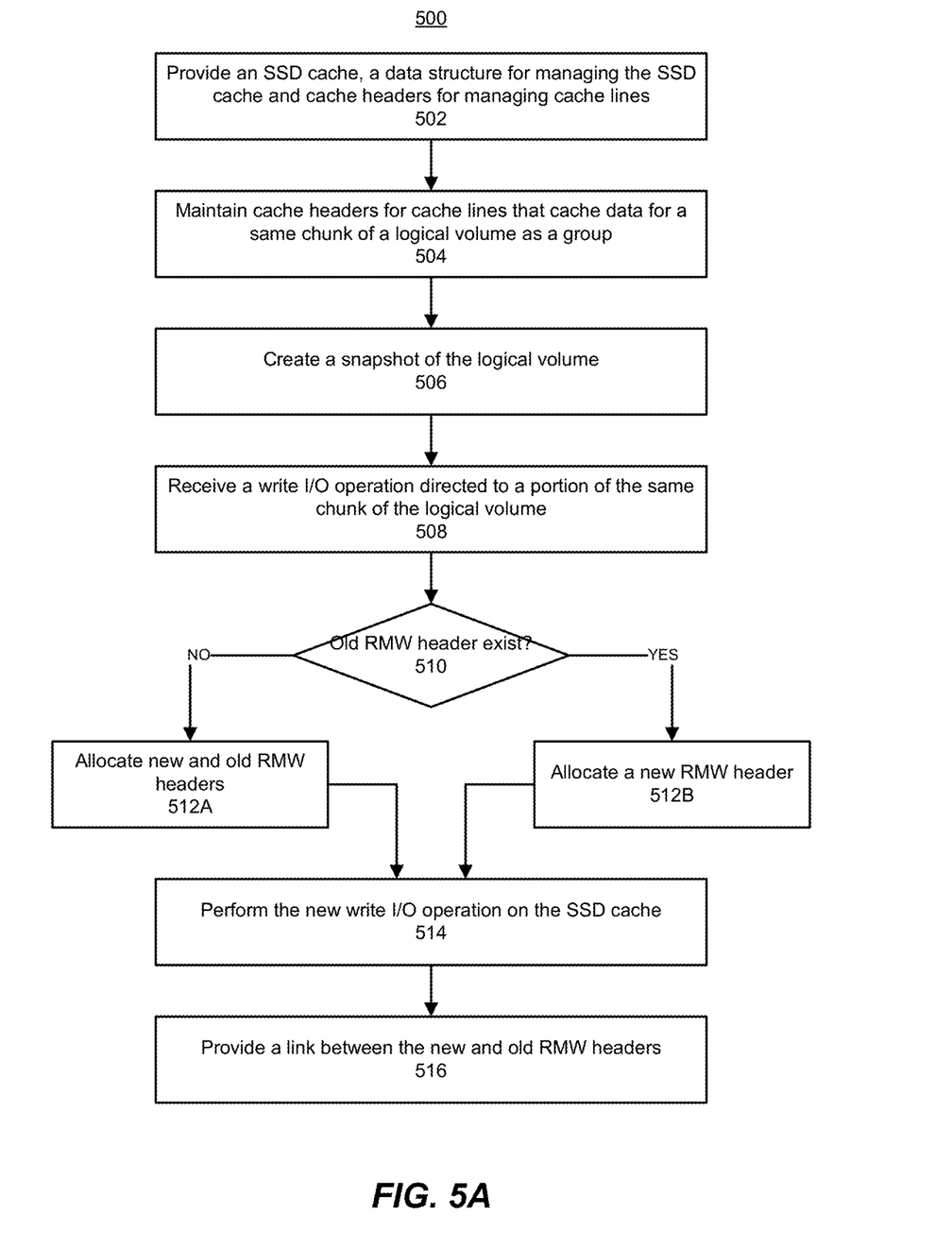
FIG. 5A is a flow diagram illustrating example operations for offloading RMW operations to a caching medium as described herein.
Figure 5B:
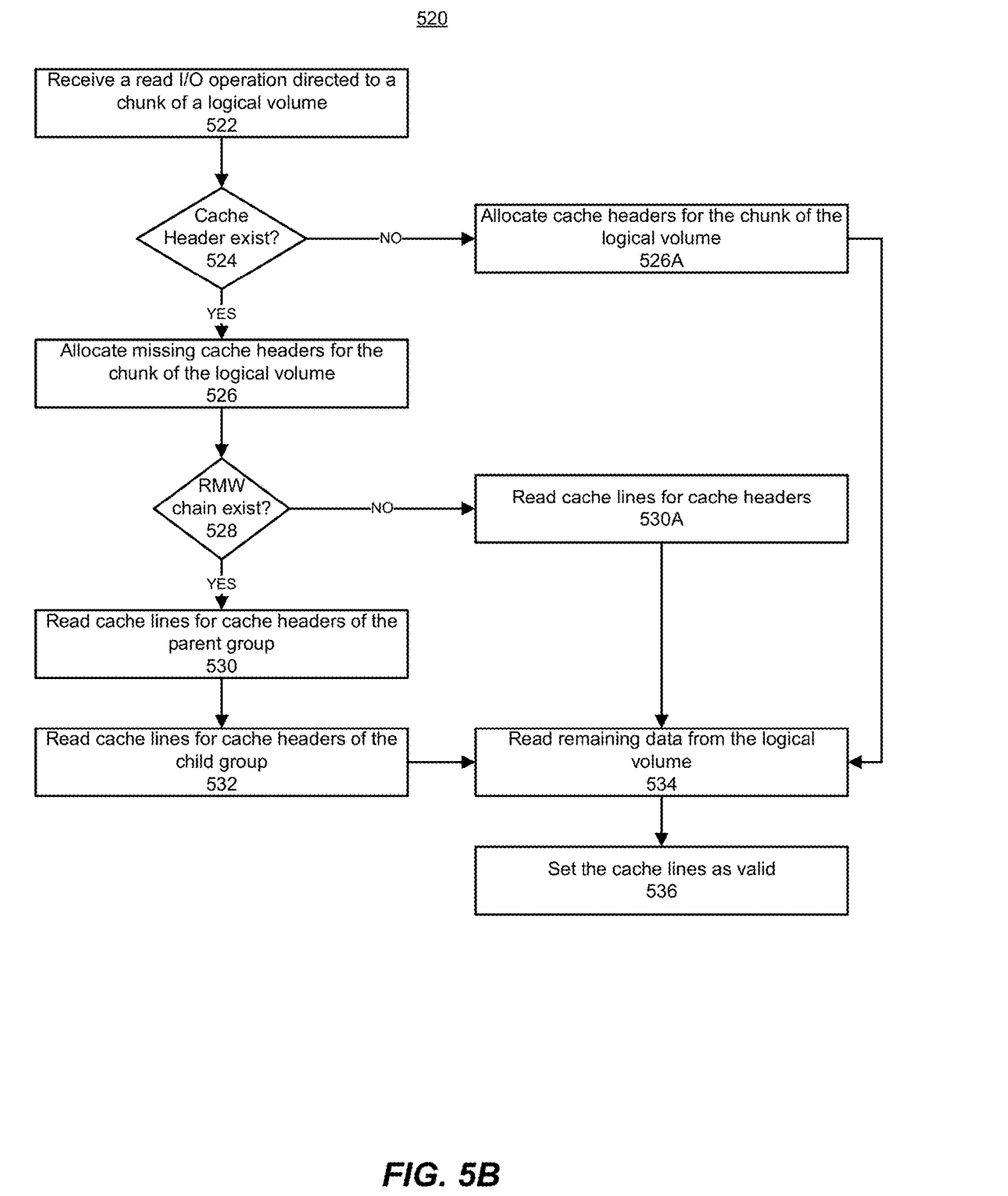
FIG. 5B is another flow diagram illustrating example operations for offloading RMW operations to a caching medium as described herein.

Referring now to FIGS. 5A-5B, flow diagrams illustrating example operations for offloading RMW operations to a caching medium are shown. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5A is a flow diagram illustrating example operations 500 for performing write I/O operations using the primitive RMW function described above. At 502, an SSD cache (e.g., the SSD cache medium 330 shown in FIG. 3), a data structure for managing the SSD cache (e.g., the data structure 402 shown in FIGS. 4A-4B) and cache headers (e.g., the cache headers 406 shown in FIGS. 4A-4B) can be provided. At 504, cache headers for cache lines that correspond to a same chunk of a logical volume can be maintained as a group within a same bucket of the data structure. For example, in FIGS. 4A-4B, the cache headers 406 of the group of cache headers 408A are maintained as a group within the same bucket of the data structure 402. Additionally, the cache headers 406 of the group of cache headers 408A are cache headers for cache lines that cache old data stored at a LBA of a snapshot volume (e.g., data stored at an old LBA). At 506, a snapshot of the logical volume can be created. Then, at 508, a write I/O operation directed to a portion of the same chunk of the logical volume can be received. As described above, the chunk is optionally a 64 KB block of the logical volume, and the sub-chunk-sized write I/O operation is optionally directed to an 8 KB portion of this 64 KB block of the logical volume.

At 510, a determination is made as to whether an old RMW header (e.g., the old RMW header 407B shown in FIG. 4B) exists. If NO, at 512A, a new RMW header (e.g., the RMW header 407A shown in FIG. 4B) for at least one of the cache lines that cache new data for the write I/O operation can be allocated. Additionally, as described above, the new RMW header can be maintained in a new group of cache headers (e.g., the new group of cache headers 408B shown in FIG. 4B) within a bucket of the data structure. Further, an old RMW header (e.g., the old RMW header 407B shown in FIG. 4B) for the group of the cache headers for the cache lines that cache data for the same chunk of the volume can be allocated. Additionally, as described above, the old RMW header can be maintained in the group of the cache headers for the cache lines that cache data for the same chunk of the volume (e.g., the group of cache headers 408A shown in FIG. 4B). If YES, at 512B, a new RMW header (e.g., the RMW header 407A shown in FIG. 4B) for at least one of the cache lines that cache new data for the write I/O operation can be allocated. Additionally, as described above, the new RMW header can be maintained in a new group of cache headers (e.g., the new group of cache headers 408B shown in FIG. 4B) within a bucket of the data structure. In other words, if the old RMW cache header exists, only the new RMW cache header needs to be allocated.

Then, at 514, the write I/O operation is performed on the SSD cache by writing new data to a cache line. At 516, a link (e.g., the link 410 shown in FIG. 4B) can be provided between the new and old RMW headers. As described above, the new RMW header can be provided with next and/or previous pointers to the subsequent and/or previous RMW headers in a chain. Similarly, the old RMW header can be provided with next and/or previous pointers to the subsequent and/or previous RMW headers in a chain.

FIG. 5B is a flow diagram illustrating example operations 520 for performing subsequent read I/O operations after the primitive RMW function is called. At 522, a read I/O operation directed to a chunk of a logical volume is received. At 524, a determination is made as to whether a cache header for the chunk of the logical volume exists, for example, by performing a cache header search. For example, as described above with regard to FIGS. 4A-4B, cache headers for cache lines can be assigned to a particular bucket of a data structure (e.g., the buckets 404 of the data structure 402 shown in FIGS. 4A-4B) based on the location of the data block in the underlying storage medium. Accordingly, cache headers for cache lines that cache data for a same chunk of a logical volume can be maintained as a group of cache headers within a particular bucket of the data structure. If YES, at 526, missing cache headers, if any, for the chunk of the logical volume can be allocated. For example, as described above, a chunk of the logical volume can optionally be a 64 KB data block, and cache line granularity can be set at 8 KB. Accordingly, eight cache headers (e.g., 64 KB chunk/8 KB cache line granularity) are needed to manage the maximum of eight cache lines that cache the data for the chunk of the logical volume. In some cases, however, the entire chunk of the logical volume may not be cached in the SSD cache, and therefore, missing cache headers would be allocated.

At 528, a determination is made as to whether a RMW header chain exists. For example, when RMW operations are offloaded to the caching medium of the logical volume as described above with regard to FIGS. 4A-4B, a new RMW cache header (e.g., new RMW cache header 407A shown in FIG. 4B) and an old RMW cache header (e.g., old RMW cache header 407B shown in FIG. 4B) can be allocated. Additionally, the new RMW cache header can be maintained in a group of cache headers (e.g., the new group of cache headers 408B) that cache data for a new LBA of the logical volume, and the old RMW header can be maintained in a group of cache headers (e.g., the group of cache headers 408A) that cache data for an old LBA of a snapshot volume. Further, the new and old RMW headers can be linked (e.g., by the link 410 shown in FIG. 4B). It is therefore possible to follow the link 410 between the new RMW header 407A of the new group of cache headers 408B and the old RMW header 407B of the group of cache headers 408A. If a RMW chain exists, at 530, the data in the cache lines managed by the cache headers of the parent group (e.g., the group of cache headers 408A) can be read. This data is the old data stored at a LBA of the snapshot volume (e.g., data stored at an old LBA). Then, at 532, the data in the cache lines managed by the cache headers of the child group (e.g., the new RMW header 407A of the new group of cache headers 408B) can be read. This data is the new data, i.e., new data for a write I/O operation received at the logical volume at an earlier time. Optionally, in the cases when the entire chunk of the logical volume is not cached in the SSD cache, remaining data can be read from the logical volume at 534. This remaining data can then be stored in the missing cache lines allocated in step 526. Then, at 536, the cache lines for the chunk of the logical volume can be set as valid, for example, by setting a bit in each of the cache headers.

Returning now to step 524, if no cache header for the chunk of the logical volume exists, all of the cache headers for the chunk of the logical volume can be allocated at 526A. For example, as described above, a chunk of the logical volume can optionally be a 64 KB data block, and cache line granularity can be set at 8 KB. Accordingly, eight cache headers (e.g., 64 KB chunk/8 KB cache line granularity) would need to be allocated to manage the eight cache lines that cache the data for the chunk of the logical volume. Then, similar as described above, the remaining data can be read from the logical volume at 534. This remaining data can then be stored in the cache lines allocated in step 526A. Then, at 536, the cache lines for the chunk of the logical volume can be set as valid, for example, by setting a bit in each of the cache headers.

Returning now to step 528, if no RMW chain exists, the data in the cache lines of the SSD cache that cache the data for the chunk of the logical volume can be read. Then, similar as described above, the remaining data can be read from the logical volume at 534. This remaining data can then be stored in the missing cache lines allocated in step 526. Then, at 536, the cache lines for the chunk of the logical volume can be set as valid, for example, by setting a bit in each of the cache headers.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method for offloading read-modify-write (RMW) operations on a volume of a data storage system to a caching medium for the data storage system, comprising:
   providing an SSD cache including a plurality of cache lines;
   providing a data structure including a plurality of buckets for managing the SSD cache;
   providing a plurality of cache headers for managing the cache lines, each cache header associating a cache line and a corresponding data block of the volume;
   maintaining one or more of the cache headers for one or more of the cache lines that cache data for a same chunk of the volume as a group within a same bucket of the data structure;
   creating a snapshot of the volume;
   after creating the snapshot of the volume, receiving a write I/O operation directed to a portion of the same chunk of the volume;
   allocating a new RMW header for at least one of the cache lines that cache new data for the write I/O operation;
   maintaining the new RMW header in a new group within one of the buckets of the data structure;
   performing the write I/O operation on the SSD cache by writing the new data to the at least one of the cache lines;
   allocating an old RMW header for the group of the cache headers for the cache lines that cache data for the same chunk of the volume;
   maintaining the old RMW header with the group of the cache headers for the cache lines that cache data for the same chunk of the volume; and
   providing a link between the new and old RMW headers.

2. The computer-implemented method of claim 1, wherein providing a link between the new and old RMW headers further comprises providing at least one of the new RMW header or the old RMW header with a pointer that references the other of the new RMW header or the old RMW header.

3. The computer-implemented method of claim 1, further comprising:
   receiving a read I/O operation directed to the same chunk of the volume; and
   performing the read I/O operation by:
   using the cache headers of the group maintained within the same bucket of the data structure, reading data from the cache lines that cache data for the same chunk of the volume; and
   using the new RMW header of the new group maintained within the one of the buckets of the data structure, reading the new data from the at least one of the cache lines.

4. The computer-implemented method of claim 3, wherein performing the read I/O operation further comprises following the link between the new RMW header and the old RMW header.

5. The computer-implemented method of claim 1, further comprising flushing data corresponding to the same chunk of the volume from the SSD cache to the data storage system by:
  merging data from the cache lines that cache data for the same chunk of the volume and the new data from the at least one of the cache lines;
  flushing the merged data from the SSD cache to the data storage system; and
  breaking the link between the new and old RMW headers.

6. The computer-implemented method of claim 1, wherein the portion of the same chunk of the volume is a sub-chunk-sized portion of the same chunk of the volume.

7. The computer-implemented method of claim 1, wherein the SSD cache is controlled in a write-back cache mode.

8. The computer-implemented method of claim 1, wherein the snapshot is a redirect-on-write snapshot or a copy-on-write snapshot.

9. A non-transitory computer-readable recording medium having computer-executable instructions stored thereon for offloading read-modify-write (RMW) operations on a volume of a data storage system to an SSD cache for the data storage system that, when executed by a data storage system computer, cause the data storage system computer to:
  provide a data structure including a plurality of buckets for managing the SSD cache;
  provide a plurality of cache headers for managing a plurality of cache lines of the SSD cache, each cache header associating a cache line and a corresponding data block of the volume;
  maintain one or more of the cache headers for one or more of the cache lines that cache data for a same chunk of the volume as a group within a same bucket of the data structure;
  create a snapshot of the volume;
  after creating the snapshot of the volume, receive a write I/O operation directed to a portion of the same chunk of the volume;
  allocate a new RMW header for at least one of the cache lines that cache new data for the write I/O operation;
  maintain the new RMW header in a new group within one of the buckets of the data structure;
  perform the write I/O operation on the SSD cache by writing the new data to the at least one of the cache lines;
  allocate an old RMW header for the group of the cache headers for the cache lines that cache data for the same chunk of the volume;
  maintain the old RMW header with the group of the cache headers for the cache lines that cache data for the same chunk of the volume; and
  provide a link between the new and old RMW headers.

10. The non-transitory computer-readable recording medium of claim 9, wherein providing a link between the new and old RMW headers further comprises providing at least one of the new RMW header or the old RMW header with a pointer that references the other of the new RMW header or the old RMW header.

11. The non-transitory computer-readable recording medium of claim 9, having further computer-executable instructions stored thereon that, when executed by the data storage system computer, cause the data storage system computer to:
  receive a read I/O operation directed to the same chunk of the volume; and
  perform the read I/O operation by:
    using the cache headers of the group maintained within the same bucket of the data structure, reading data from the cache lines that cache data for the same chunk of the volume; and
    using the new RMW header of the new group maintained within the one of the buckets of the data structure, reading the new data from the at least one of the cache lines.

12. The non-transitory computer-readable recording medium of claim 11, wherein performing the read I/O operation further comprises following the link between the new RMW header and the old RMW header.

13. The non-transitory computer-readable recording medium of claim 9, having further computer-executable instructions stored thereon that, when executed by the data storage system computer, cause the data storage system computer to:
  merge data from the cache lines that cache data for the same chunk of the volume and the new data from the at least one of the cache lines;
  flush the merged data from the SSD cache to the data storage system; and
  break the link between the new and old RMW headers.

14. The non-transitory computer-readable recording medium of claim 9, wherein the portion of the same chunk of the volume is a sub-chunk-sized portion of the same chunk of the volume.

15. The non-transitory computer-readable recording medium of claim 9, wherein the SSD cache is controlled in a write-back cache mode.

16. A data storage system, comprising:
  a plurality of disks providing a physical storage capacity of the data storage system;
  an SSD cache providing a caching medium for the data storage system, the SSD cache including a plurality of cache lines;
  a data storage system computer comprising a processor and a memory in communication with the processor, the memory having computer-executable instructions stored thereon that, when executed by the processor, cause the data storage system computer to:
    provide a data structure including a plurality of buckets for managing the SSD cache;
    provide a plurality of cache headers for managing the cache lines, each cache header associating a cache line and a corresponding data block of the volume;
    maintain one or more of the cache headers for one or more of the cache lines that cache data for a same chunk of the volume as a group within a same bucket of the data structure;
    create a snapshot of the volume;
    after creating the snapshot of the volume, receive a write I/O operation directed to a portion of the same chunk of the volume;
    allocate a new RMW header for at least one of the cache lines that cache new data for the write I/O operation;
    maintain the new RMW header in a new group within one of the buckets of the data structure;
    perform the write I/O operation on the SSD cache by writing the new data to the at least one of the cache lines;
    allocate an old RMW header for the group of the cache headers for the cache lines that cache data for the same chunk of the volume;

maintain the old RMW header with the group of the cache headers for the cache lines that cache data for the same chunk of the volume; and provide a link between the new and old RMW headers.

17. The data storage system of claim 16, wherein providing a link between the new and old RMW headers further comprises providing at least one of the new RMW header or the old RMW header with a pointer that references the other of the new RMW header or the old RMW header.

18. The data storage system of claim 16, wherein the memory has further computer-executable instructions stored thereon that, when executed by the processor, cause the data storage system computer to:

receive a read I/O operation directed to the same chunk of the volume; and perform the read I/O operation by:

using the cache headers of the group maintained within the same bucket of the data structure, reading data from the cache lines that cache data for the same chunk of the volume; and using the new RMW header of the new group maintained within the one of the buckets of the data structure, reading the new data from the at least one of the cache lines.

19. The data storage system of claim 18, wherein performing the read I/O operation further comprises following the link between the new RMW header and the old RMW header.

20. The data storage system of claim 16, wherein the memory has further computer-executable instructions stored thereon that, when executed by the processor, cause the data storage system computer to:

merge data from the cache lines that cache data for the same chunk of the volume and the new data from the at least one of the cache lines;

flush the merged data from the SSD cache to the data storage system; and break the link between the new and old RMW headers.

\* \* \* \* \*